Feb. 10, 1959 P. R. SCHAEFER ET AL 2,873,355
GAS SHIELDED METAL ARC WELDING TORCH
Filed April 5, 1957
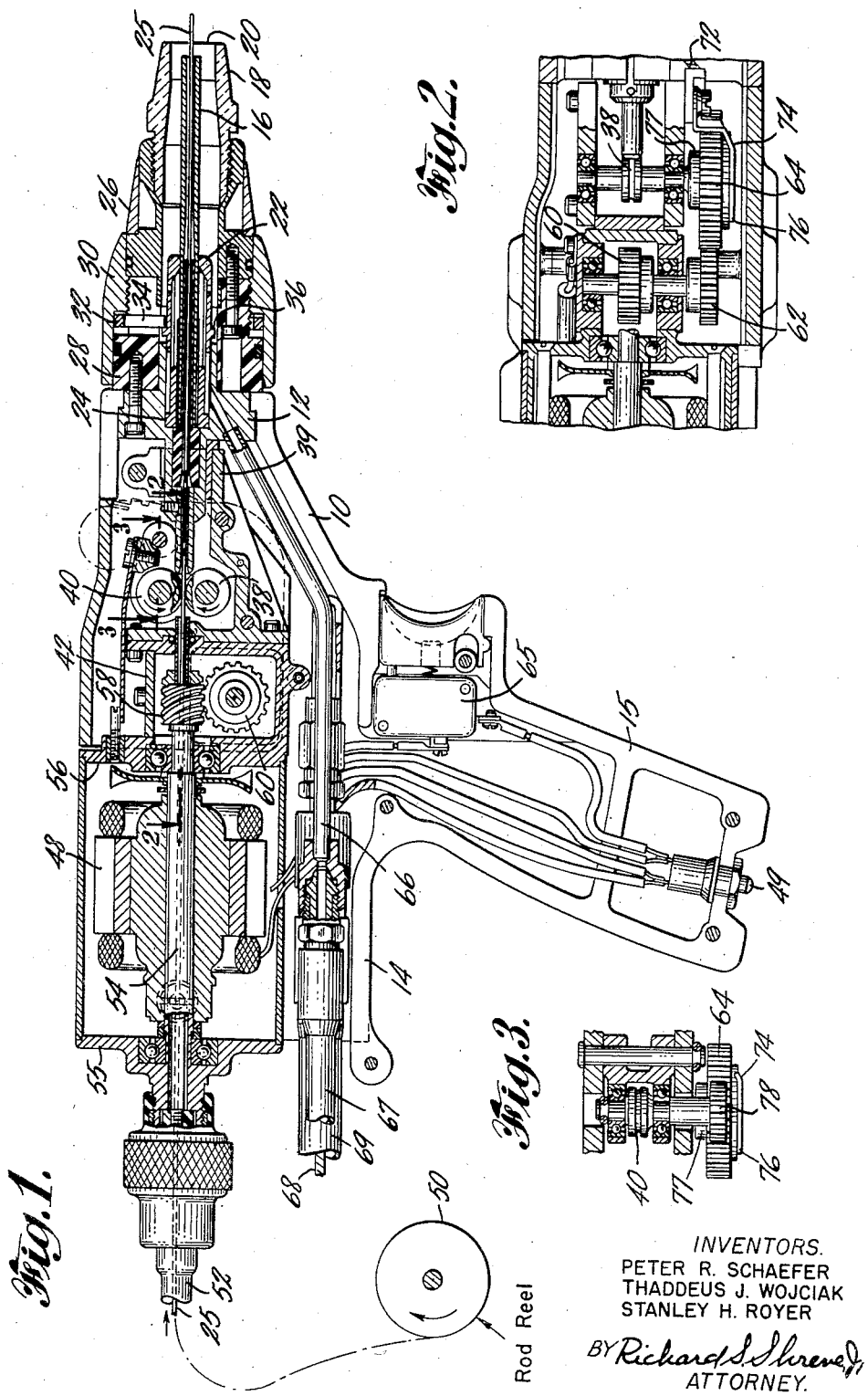
INVENTORS.
PETER R. SCHAEFER
THADDEUS J. WOJCIAK
STANLEY H. ROYER
BY Richard S. Shreve Jr.
ATTORNEY.

United States Patent Office 2,873,355
Patented Feb. 10, 1959

2,873,355

GAS SHIELDED METAL ARC WELDING TORCH

Peter R. Schaefer, Newark, and Thaddeus J. Wojciak and Stanley H. Royer, Elizabeth, N. J., assignors to Union Carbide Corporation, a corporation of New York Application April 5, 1957, Serial No. 651,071

7 Claims. (Cl. 219—130)

This invention relates to gas shielded metal arc welding torches, and more particularly to a hand gun for feeding very small electrode wire.

Torches of this character are provided with a guide tube for directing the electrode wire out through the discharge orifice, and for supplying electric welding current to the electrode wire passing therethrough. Momentary loss of contact in the guide tube caused current surges and burnback requiring replacement of the guide tube. This guide tube replacement in former torches has been a cause of much down time in the welding operation.

The main objects of the present invention are to eliminate the difficulties referred to above, to smooth out current surges and thereby stabilize the arc, to reduce the down time previously required for replacement of damaged guide tubes, and to provide a more compact pull type sigma gun.

According to the present invention the loss of contact is prevented by feed back of the welding current to the wire driving rolls, preferably by a brush engaging a collector ring for one of the feed rolls. The removal of the guide tube is facilitated by a collet control member rotatably mounted between the gun barrel and nozzle, and means actuated by turning the control member in opposite directions for causing relative longitudinal movement of the collet body and collet to respectively grip and release the guide tube.

In the drawings:

Fig. 1 is a horizontal section through a hand gun according to the preferred embodiment of the present invention;

Fig. 2 is a section taken along the line 2—2 of Fig. 1; and

Fig. 3 is a section taken along the line 3—3 of Fig. 1.

The torch shown in the drawing comprises a portable hand gun provided with a drive unit assembly or handle 10 having a barrel 12, a motor support portion 14 and a hand grip portion 15. The barrel 12 contains an electrode wire guide tube 16. A gas directing nozzle 18 surrounds the outer end of the guide tube 16 and extends therebeyond to a discharge orifice 20.

For securing the guide tube 16 in the barrel 12, a collet body 22 is slidably mounted in the bore thereof, and a collet 24 is slidable in the bore of the collet body. For securing the nozzle 18 to the barrel 12, the nozzle is screwed into a water jacket 26 bolted to the plastic insulator body 28. A locking nut 30 is screwed onto the body 28, and contains a spring tempered locking ring 32 having fingers 34 extending through slots in the body 28 and contacting an annular lip 36 on the collet body 22. When the locking nut 30 is tightened onto the insulator body 28, the force exerted on the spring tempered locking ring 32 is transmitted to the collet body 22, moving it back into the torch so as to load the conical seat on the collet. Therefore, quick release of the torch guide tube is accomplished by merely loosening the locking nut.

Driven feed roll 38 and driven back-up roll 40 are journaled in a section 39 of the drive unit assembly 10 behind the guide tube 16 for pushing the electrode wire 25 through the guide tube and on out through the discharge orifice 20. For driving these rolls, a gear box 42 and a wire feed motor 48 are mounted in the rear portion of the drive unit assembly 10. The feed motor is energized from a lighting circuit source, and is provided with an inching button 49 on the handle 15. Guide tube replacement is accomplished by inching out the wire guide tube by means of the wire inching button 49 after the locking nut has been loosened. This easy guide tube replacement is accomplished without having welding current on the wire, and without interfering with the feed roll section of the torch, and no tools are required.

The electrode wire 25 is supplied from a reel 50 through a flexible conduit 52 to the rear of the drive unit assembly 10. The wire feed motor 48 has a hollow armature 54 journaled in bearing bells 55 and 56 in the drive unit assembly 10. The hollow armature 54 has an extension into the gear box 42 forming a hollow shaft for a worm 58 driving a worm gear 60. The electrode wire 25 from the conduit passes through the hollow armature 54 and hollow worm shaft to the feed roll 38 and back-up roll 40. The worm gear 60 is rigid with the shaft of a pinion 62 meshing with a gear 64 rigid with the shaft of the driven feed roll 38. Pinion gear 77 rigid with the shaft of driven feed roll 38 meshes with mating pinion gear 78 rigid with the shaft of driven back-up roll 40 to drive the back-up roll.

Shielding gas such as argon is supplied from a hose 67 entering the rear of the motor support section 14 and connected to the rear of the barrel 12 by a tube 66. Electric welding current is supplied by a conductor 68 in a water outlet hose 69 entering the rear of the motor support section 14, which hose is connected to the barrel 12 by a tube similar to tube 66. A trigger switch 65 on the hand grip portion 15 energizes the welding circuit through a relay in the control apparatus. The welding current passes through barrel 12, collet 24, and guide tube 16 to the electrode wire 25.

Feed back of the welding current for the hot feed roll operation is supplied by another conductor 72 from the barrel 12 to a spring brush 74 engaging a collector ring 76 on the shaft of the driven feed roll 38.

What is claimed is:

1. In an inert gas shielded metal arc welding gun comprising a barrel, an electrode wire guide tube in said barrel, a gas directing nozzle surrounding the outer end of said guide tube and extending therebeyond to a discharge orifice, feed rolls journaled in said gun behind said guide tube for pushing the electrode wire through said guide tube and on out through said discharge orifice, means for supplying electric welding current through said barrel to said guide tube, a collector ring on one of said feed rolls, and a brush for supplying welding current through said brush and collector ring to said feed roll to energize said wire electrode before it reaches said guide tube.

2. In an inert gas shielded metal arc welding gun comprising a barrel, a collet in said barrel, an electrode wire guide tube gripped by said collet, a gas directing nozzle surrounding the outer end of said guide tube and extending therebeyond, and means actuated from the discharge end of said gun without removing said nozzle for releasing said collet.

3. In an inert gas shielded metal arc welding gun comprising a barrel, a collet in said barrel, an electrode wire guide tube gripped by said collet, a gas directing nozzle surrounding the outer end of said guide tube and extending therebeyond to a discharge orifice, feed rolls journaled in said gun behind said collet for pushing the electrode wire through said guide tube and on out through said discharge orifice, means for supplying electric welding current to said guide tube, and means for supplying electric welding current through one of said feed rolls to the electrode wire to energize the same before it reaches said guide tube.

4. In an inert gas shielded metal arc welding gun comprising a barrel, a collet body in said barrel, a collet in said body, an electrode wire guide tube gripped by said collet, a gas directing nozzle surrounding the outer end of said guide tube and extending therebeyond, a collet control member rotatably mounted between said nozzle and said barrel coaxial with said guide tube, and means actuated by turning said control member in opposite directions for causing relative longitudinal movement of said collet and body to respectively grip and release said guide tube.

5. In an inert gas shielded metal arc welding gun comprising a barrel, a collet in said barrel, an electrode wire guide tube gripped by said collet, a water jacket surrounding the outer end of said guide tube, a gas directing nozzle mounted on said water jacket, a collet control member rotatably mounted between said water jacket and said barrel, and means actuated by turning said control member for releasing the grip of said collet on said guide tube.

6. In an inert gas shielded metal arc welding hand gun comprising a barrel and a handle, an electrode wire guide tube in said barrel, a gas directing nozzle surrounding the outer end of said guide tube, feed rolls journaled in said gun behind said guide tube for pushing the wire therethrough, an electric motor behind said feed rolls for driving the same, supply hoses on the rear of said gun for supplying shielding gas, welding current and cooling water thereto, and switches on said handle for controlling the supply of current to said feed roll drive motor and welding current to one of said feed rolls.

7. In an inert gas shielded metal arc welding gun, a casing comprising bearing bells for a hollow armature, a gear box secured to one of said bearing bells, a feed roll section secured to said gear box, a barrel secured to said feed roll section, an electrode wire guide tube in said barrel, a gas directing nozzle surrounding the outer end of said wire guide tube, said hollow armature having a worm shaft extension driving gearing in said gear box for driving feed rolls in said section for pulling the electrode wire through said hollow armature and worm shaft extension and gear box into said feed roll section and pushing said electrode wire through said barrel and guide tube and out through said nozzle.

References Cited in the file of this patent

UNITED STATES PATENTS

| | | |
|---|---|---|
| Re. 14,927 | Sessions | July 27, 1920 |
| 2,236,707 | Darner | Apr. 1, 1941 |
| 2,299,785 | Barrett | Oct. 27, 1942 |
| 2,510,205 | Baird | June 6, 1950 |
| 2,572,084 | Wilson | Oct. 23, 1951 |
| 2,606,267 | McElrath | Aug. 5, 1952 |